(12) United States Patent
Bengani-Lutz et al.

(10) Patent No.: US 11,896,937 B2
(45) Date of Patent: Feb. 13, 2024

(54) FABRICATION OF FILTRATION MEMBRANES

(71) Applicant: Trustees of Tufts College, Medford, MA (US)

(72) Inventors: Prity Bengani-Lutz, Somerville, MA (US); Ayse Asatekin Alexiou, Arlington, MA (US)

(73) Assignee: Trustees of Tufts College, Medford, MA (US)

( * ) Notice: Subject to any disclaimer, the term of this patent is extended or adjusted under 35 U.S.C. 154(b) by 129 days.

(21) Appl. No.: 16/346,590

(22) PCT Filed: Oct. 20, 2017

(86) PCT No.: PCT/US2017/057517
§ 371 (c)(1),
(2) Date: May 1, 2019

(87) PCT Pub. No.: WO2018/085057
PCT Pub. Date: May 11, 2018

(65) Prior Publication Data
US 2019/0262781 A1 Aug. 29, 2019

Related U.S. Application Data

(60) Provisional application No. 62/416,340, filed on Nov. 2, 2016.

(51) Int. Cl.
| | | |
|---|---|---|
| *B01D 67/00* | (2006.01) | |
| *B01D 69/02* | (2006.01) | |
| *B01D 69/12* | (2006.01) | |
| *B01D 71/32* | (2006.01) | |
| *B01D 71/80* | (2006.01) | |
| *B01D 71/40* | (2006.01) | |
| *C08F 220/24* | (2006.01) | |
| *B01D 69/10* | (2006.01) | |
| *C08F 220/38* | (2006.01) | |

(52) U.S. Cl.
CPC ......... *B01D 71/80* (2013.01); *B01D 67/0011* (2013.01); *B01D 67/0016* (2013.01); *B01D 67/0083* (2013.01); *B01D 69/02* (2013.01); *B01D 69/12* (2013.01); *B01D 71/32* (2013.01); *B01D 71/40* (2013.01); *C08F 220/24* (2013.01); *B01D 69/10* (2013.01); *B01D 2325/02* (2013.01); *B01D 2325/18* (2013.01); *B01D 2325/20* (2013.01); *C08F 220/387* (2020.02)

(58) Field of Classification Search
None
See application file for complete search history.

(56) References Cited

U.S. PATENT DOCUMENTS

| | | | | |
|---|---|---|---|---|
| 4,377,654 A * | 3/1983 | Haas | ................. | C08K 5/19 528/274 |
| 4,673,418 A | 6/1987 | Peinemann | | |
| 2002/0102280 A1 | 8/2002 | Anderson | | |
| 2009/0078640 A1 | 3/2009 | Chu et al. | | |
| 2012/0318729 A1 * | 12/2012 | Yip | ................. | B01D 69/12 427/244 |
| 2014/0363572 A1 * | 12/2014 | Moll | ................. | B01D 67/003 427/244 |
| 2016/0187536 A1 * | 6/2016 | Noro | ................. | G02B 1/04 252/582 |

FOREIGN PATENT DOCUMENTS

| | | | | |
|---|---|---|---|---|
| CN | 1128176 A | 8/1996 | | |
| CN | 104959047 A | 10/2015 | | |
| KR | 2015-0004788 A | 1/2015 | | |
| WO | WO-2015/070004 A1 | 5/2015 | | |
| WO | WO-2015070004 A1 * | 5/2015 | ............ | B01D 71/28 |
| WO | WO-2016/109621 A1 | 7/2016 | | |
| WO | WO-2016/144926 A1 | 9/2016 | | |

OTHER PUBLICATIONS

Terayama et al., Well-Defined Poly(sulfobetaine) Brushes Prepared by Surface-Initiated ATRP Using a Fluoroalcohol and Ionic Liquids as the Solvents, 44 Macromolecules 104, 104-111 (2011). (Year: 2011).*

Brown et al., Effect of Ionic Liquid on Mechanical Properties and Morphology of Zwitterionic Copolymer Membranes, 43 Macromolecules 790, 790-796 (2010). (Year: 2010).*

International Search Report and Written Opinion for International Application No. PCT/US2017/57517 dated Jan. 8, 2018.

(Continued)

*Primary Examiner* — Bradley R Spies
(74) *Attorney, Agent, or Firm* — Foley Hoag LLP; Dana M. Gordon; David S. Surry

(57) ABSTRACT

Disclosed is a method of preparing a filtration membrane. The method includes providing a copolymer solution by dissolving a statistical copolymer in a mixture of a co-solvent and a first organic solvent, coating the copolymer solution onto a porous support layer to form a polymeric layer thereon, coagulating the polymeric layer on top of the support layer to form a thin film composite membrane, and immersing the thin film composite membrane into a water bath to obtain a filtration membrane. Also disclosed are a filtration membrane prepared by the method, and a process of filtering a liquid using the filtration membrane thus prepared.

10 Claims, 5 Drawing Sheets

(56) References Cited

OTHER PUBLICATIONS

Bengani et al., "Zwitterionic copolymer self-assembly for fouling resistant, high flux membranes with size-based small molecule selectivity," Journal of Membrane Science, 493:755-765 (2015).
Extended European Search Report for EP Application No. 17867365.3 dated Jun. 22, 2020.
International Preliminary Report on Patentability for International Application No. PCT/US2017/057517 dated May 7, 2019.
Yi et al., "Ionic liquids as co-solvents for zwitterionic copolymers and the preparation of poly(vinylidene fluoride) blend membranes with dominated [beta]-phase crystals," Polymer, 55(11):2688-2696 (2014).

* cited by examiner

FABRICATION OF FILTRATION MEMBRANES

RELATED APPLICATIONS

This application is a U.S. National-Stage Application under 35 U.S.C. § 371 of International Application PCT/US17/57517, filed Oct. 20, 2017, which claims the benefit of priority to U.S. Provisional Application No. 62/416,340, filed Nov. 2, 2016.

BACKGROUND

Filtration membranes continue to receive great attention for their wide use in purification and separation in the food, dairy, beverage, and pharmaceutical industries.

Membranes with high flux (i.e., high permeability) and high selectivity are desired for energy-efficient membrane separations. Existing methods for improving membrane flux include grafting and blending. These methods either require lengthy manufacturing or post-processing steps, lead to loss of selectivity, or provide only certain membrane types (e.g., porous ultrafiltration and microfiltration membranes), thereby restricting their use in fabricating filtration membranes with dense selective layers.

There is a need for a new method to prepare highly permeable and selective filtration membranes.

SUMMARY

To meet this need, disclosed herein is a method of preparing a filtration membrane.

The method includes the following steps: (i) providing a copolymer solution by dissolving a statistical copolymer in a mixture of a co-solvent and a first organic solvent; (ii) coating the copolymer solution onto a porous support layer to form a polymeric layer thereon; (iii) coagulating the polymeric layer on top of the support layer to form a thin film composite membrane, and (iv) immersing the thin film composite membrane into a water bath to obtain a filtration membrane.

The copolymer solution contains the statistical copolymer at 1 to 99 w/v % (e.g., 1 to 50 w/v % and 3 to 30 w/v %), the co-solvent at 1 to 99 v/v % (e.g., 1 to 80 v/v % and 5 to 49 v/v %), and the first organic solvent at 1 to 99 v/v % (e.g., 20 to 99 v/v % and 51 to 95 v/v %).

The statistical copolymer contains zwitterionic repeat units and hydrophobic repeat units, in which the zwitterionic repeat units constitute 15-75% (e.g., 20-70% and 30-50%) by weight of the statistical copolymer, the hydrophobic repeat units constitute 25-85% (e.g., 30-80% and 50-70%) by weight of the statistical copolymer, and the hydrophobic repeat units are capable of forming a homopolymer that has a glass transition temperature of 0° C. or higher (e.g., room temperature or higher).

The co-solvent can be an ionic liquid, a surfactant molecule, or a second organic solvent. Importantly, the co-solvent is miscible with both water and the first organic solvent.

Examples of the first organic solvent include, but are not limited to, trifluoroethanol, dimethyl sulfoxide, formamide, dimethyl formamide, hexafluoro isopropanol, N-methyl-2-pyrrolidone, pyridine, dioxane, toluene, chloroform, benzene, carbon tetrachloride, chlorobenzene, 1,1,2-trichloroethane, dichloromethane, ethylene dichloride, xylene, tetrahydrofuran, methanol, and ethanol. Examples of the second organic solvent include, but are not limited to, trifluoroethanol, hexafluoro isopropanol, dioxane, chloroform, dichloromethane, methylene chloride, ethylene dichloride, tetrahydrofuran, acetonitrile, 2-butanol, 2-butanone, methanol, and ethanol.

The coagulating step, i.e., step (iii), is typically performed via air drying the polymeric layer (formed after copolymer solution is spread onto the porous support) for 60 minutes or less (e.g., 10 minutes and 20 seconds). It can also be performed via immersing the polymeric selective layer together with the porous support layer formed in the coating step, i.e., step (ii), into a non-solvent bath for 60 minutes or less (e.g., 20 minutes and 10 minutes). Typically, the non-solvent is methanol, ethanol, isopropanol, butanol, acetone, water, or a combination thereof.

The method described above can further include an annealing step after the immersing step, i.e., step (iv), in which the filtration membrane thus obtained is annealed in a water bath at 50° C. or higher (e.g., 70° C. and 90° C.).

Also within the scope of this invention is a filtration membrane prepared by the method described above. The membrane has an effective pore size of 0.5 to 5 nm (e.g., 0.6 to 3 nm and 0.8 to 2 nm) and a water permeance of 10 $Lm^{-2}h^{-1}$ $bar^{-1}$ or higher (e.g., 20 $Lm^{-2}h^{-1}$ $bar^{-1}$ or higher and 30 $Lm^{-2}h^{-1}$ $bar^{-1}$ or higher).

This invention further covers a process of filtering a liquid using the filtration membrane thus prepared.

The process includes the following steps: providing a filtration membrane prepared by the above-described method, the membrane having a support layer and a polymeric selective layer; directing a liquid through the filtration membrane, first through the polymeric selective layer and then through the support layer; and, finally, collecting the liquid that permeates through the filtration membrane.

The details of the invention are set forth in the description below. Other features, objects, and advantages of the invention will be apparent from the following drawings and detailed description of several embodiments, and also from the appending claims.

DETAILED DESCRIPTION

Figure 1:
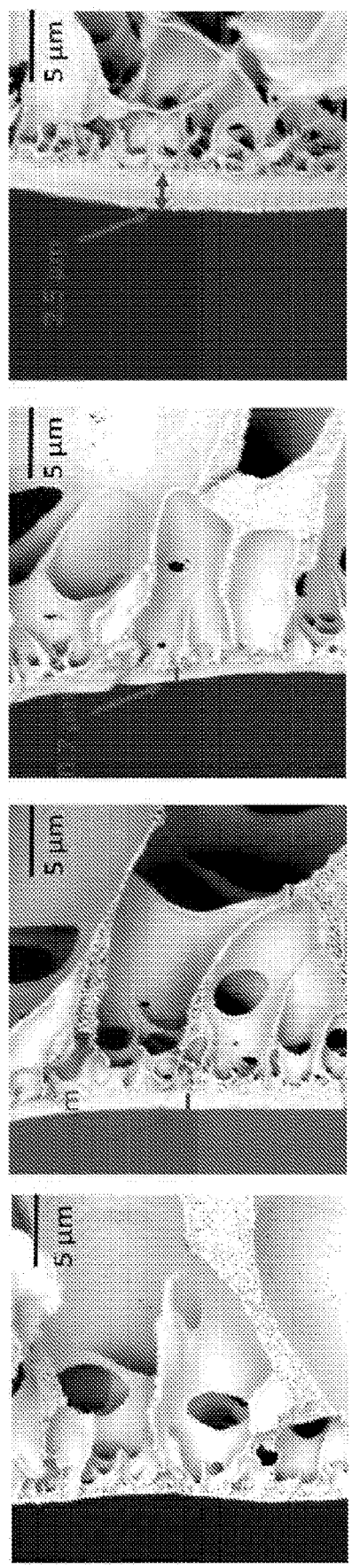
FIG. 1 is a schematic depiction of cross-sectional SEM images of membranes. Left to right: Cross-sectional SEM images of uncoated PVDF 400R base membrane (sample 2-5) and three modified P40 membranes prepared using different amounts of ionic liquid co-solvent: IL2 (sample 2-1), IL5 (sample 2-2), and IL20 (sample 2-3). All samples show dense coatings. Sample 2-1 with 2% ionic liquid co-solvent shows about 1 µm dense coating. Sample 2-2 with 5% ionic liquid co-solvent shows about 0.7 µm dense coating. Sample 2-3 with 20% ionic liquid co-solvent shows about 2.5 µm dense coating.

Disclosed first in detail herein is a method of preparing a filtration membrane that has high flux and selectivity.

Studies on block copolymer (BCP) show that tuning a copolymer casting solution by certain methods, including varying copolymer compositions (e.g., monomer structures and monomer ratios), using additives (e.g., homopolymers and metal salts), and mixing solvents (e.g., methanol and isopropanol), can change copolymer behavior and improve membrane performance.

BCP self-assembly is typically limited to domain sizes of 10-100 nm. See Park et al., *Polymer*, 2003, 44, 6725-6760. The smallest domain size reported to date is about 3 nm, which is still significantly larger than needed for membranes with molecular weight cut-off (MWCO) below 5000 g/mol. See Park et al., *Science*, 2009, 323, 1030-1033.

Random copolymers, i.e., statistical copolymers, have been reported to serve as selective layers of membranes with pore sizes about 1 nm. See Bengani et al., *Journal of Membrane Science*, 2015, 493, 755-765. Membranes having pore sizes about 1 nm are highly useful for separation and purification of small molecules in biotech, biochemical, food, beverage and wastewater industries.

Studies have not been reported on use of co-solvents, e.g., an ionic liquid, in casting solutions during membrane formation of random copolymers and how they affect membrane performance.

As described above, the method of preparing a filtration membrane covered by this invention includes the following steps: (i) providing a copolymer solution by dissolving a statistical copolymer in a mixture of a co-solvent and a first organic solvent; (ii) coating the copolymer solution onto a porous support layer to form a polymeric layer thereon; (iii) coagulating the polymeric layer on top of the support layer to form a thin film composite membrane, and (iv) immersing the thin film composite membrane into a water bath to obtain a filtration membrane.

The co-solvent used for preparing the copolymer solution is miscible with both water and the first organic solvent. Typically, the co-solvent is in liquid form at 100° C. or lower (e.g., 50° C. or lower and room temperature or lower). It can alter self-assembly of the statistical copolymer in the copolymer solution.

In one embodiment of the method, the co-solvent is an ionic liquid. The ionic liquid typically contains one or more cations of ammonium, imidazolium, piperidinium, pyridinium, pyrrolidinium, phosphonium, sulfonium, guanidinium, diethanolammonium, alkyl-ammonium, alkyl-imidazolium, alkyl-peperidinium, alkyl-pyridinium, alkyl-pyrrolidinium, alkyl-phosphonium, alkyl-sulfonium, alkyl-guanidinium, and alkyl-diethanolammonium; and one or more anions of nitrate, sulfonate, methanesulfonate, alkyl-sulfonate, fluoroalkyl-sulfonate, sulfate, methylsulfate, alkyl-sulfate, fluoroalkyl-sulfate, phosphate, methylphosphate, alkyl-phosphate, fluoroalkyl-phosphate, phosphinate, methylphosphinate, alkyl-phosphinate, fluoroalkyl-phosphinate, halogen, trifluoromethanesulfonate, dihydrogen phosphate, bis(trifluoromethylsulfonyl)imide, alkyl-imide, alkyl-amide, tetrafluoroborate, hexafluoro phosphate, formate, acetate, trifluoroacetate, dicyanamide, decanoate, alkyl-methide, and alkyl-borate. Examples of an ionic liquid include, but are not limited to, ethyl ammonium nitrate, 1-ethyl-3-methylimidazolium ethyl sulfate, 1-ethyl-3-methylimidazolium tetrafluoroborate, 1-butyl-3-methylimidazolium trifluoromethanesulfonate, 1-ethyl-3-methylimidazolium methanesulfonate, 1-butylpyridinium bromide, and 2-hydroxyethyl-dimethylammonium methanesulfonate.

In another embodiment of the method, the co-solvent is a surfactant molecule. The surfactant molecule generally contains an anionic group of sulfate, sulfonate, phosphate, carboxylate, nitrate, or sulfosuccinate, and a cationic group formed from a primary amine, a secondary amine, a tertiary amine, a quaternary ammonium, an imidazolium, a piperidinium, a pyridinium, a pyrrolidinium, or a phosphonium. Examples of the surfactant molecule include, but are not limited to, a linear alkylbenzenesulfonate, a lignin sulfonate, a fatty alcohol ethoxylate, an alkylphenyl ethoxylate, a phospholipid, a phosphatidylserine, a phosphatidylethanolamine, a phosphatidylcholine, and a sphingomyelin.

The copolymer solution is formed from a statistical copolymer that contains zwitterionic repeat units and hydrophobic repeat units.

The zwitterionic repeat units each can contain, independently, sulfobetaine, carboxybetaine, phosphorylcholine, or pyridinium alkyl sulfonate; and the hydrophobic repeat units each can be formed, independently, from styrene, fluorinated styrene, methyl methacrylate, acrylonitrile, or trifluoroethyl methacrylate. In one embodiment, the zwitterionic repeat units each are formed, independently, from sulfobetaine acrylate, sulfobetaine acrylamide, phosphorylcholine acrylate, phosphorylcholine acrylamide, phosphorylcholine methacrylate, carboxybetaine acrylate, carboxybetaine methacrylate, carboxybetaine acrylamide, 3-(2-vinylpyridinium-1-yl)propane-1-sulfonate, 3-(2-vinylpyridinium-1-yl)butane-1-sulfonate, 3-(4-vinylpyridinium-1-yl)propane-1-sulfonate, or sulfobetaine methacrylate; and the hydrophobic repeat units each are formed, independently, from methyl methacrylate, acrylonitrile, or trifluoroethyl methacrylate.

Examples of a statistical copolymer formed from the above zwitterionic repeat units and hydrophobic repeat units include, but are not limited to, poly((trifluoroethyl methacrylate)-r-(sulfobetaine methacrylate)), poly((methyl methacrylate)-r-(sulfobetaine methacrylate)), poly((trifluoroethyl methacrylate)-r-(3-(2-vinylpyridinium-1-yl)propane-1-sulfonate)), poly((trifluoroethyl methacrylate)-r-(phosphorylcholine methacrylate), and poly((trifluoroethyl methacrylate)-r-(3-(2-vinylpyridinium-1-yl)butane-1-sulfonate)).

In one embodiment of the method, the zwitterionic repeat units constitute 30-50% by weight of the statistical copolymer, the hydrophobic repeat units constitute 50-70% by weight of the statistical copolymer, the statistical copolymer is poly((trifluoroethyl methacrylate)-r-(sulfobetaine methacrylate)), the co-solvent is ethyl ammonium nitrate, and the first organic solvent is trifluoroethanol.

The copolymer solution thus formed can be coated onto a porous support layer by using any of the methods known in the field (e.g., doctor blade coating, spray coating, and dip coating).

Typically, the coagulating step is performed via air drying the polymeric layer for 60 minutes or less (e.g., 20 minutes, 10 minutes, 2 minutes, and 20 seconds). It can also be performed via immersing the polymeric layer into a non-solvent bath for 60 minutes or less (e.g., 40 minutes, 30 minutes, 20 minutes, and 10 minutes).

The method disclosed above efficiently improves flux and permeability of membranes by altering membrane manufacturing steps with the same polymeric materials without sacrificing selectivity and without adding any new steps.

Also disclosed in detail herein are filtration membranes prepared by the method described above.

Membranes prepared by the method described above unexpectedly exhibit permeances of 30 $Lm^{-2}h^{-1}$ $bar^{-1}$ or higher, which are an order of magnitude higher than those of membranes prepared without using co-solvents. Further, the membranes thus prepared also exhibit a narrow pore size distribution, while retaining the selectivity with an effective pore size of 1-2 nm or a MWCO of 1000-5000 Da, as demonstrated by filtering negatively charged and neutral dyes. Moreover, these membranes exhibit low salt retention, e.g., magnesium sulfate ($MgSO_4$) retention, in a range of 0-20%. Performance of these membranes depends on the copolymer composition, the type and amount of co-solvent, e.g., ionic liquid, and the membrane fabrication conditions (e.g., non-solvent and drying time).

Also within the scope of this invention is a process of filtering a liquid using a filtration membrane thus prepared.

As pointed out above, the process includes three steps: (i) providing a filtration membrane prepared by the above-described method, the membrane having a support layer and a polymeric selective layer; (ii) directing a liquid through the filtration membrane, first through the polymeric selective layer and then through the support layer; and (iii) collecting the liquid that permeates through the filtration membrane.

Examples of an application of the process of this invention include, but are not limited to, separation of a mixture of two dyes or solutes of similar charges but different sizes, separation of two water-soluble organic molecules having different sizes, separation of a mixture of monomers and oligomers dissolved in water, separation of a mixture of peptides, nutraceuticals, antioxidants, and other small molecules dissolved in water, treatment of wastewater, treatment of natural water sources (e.g., surface water and ground water), and removal of ions from water.

Without further elaboration, it is believed that one skilled in the art can, based on the above description, utilize the present invention to its fullest extent. The following specific examples are, therefore, to be construed as merely illustrative, and not limitative of the remainder of the disclosure in any way whatsoever. The publications cited herein are incorporated by reference in their entirety.

Example 1: Preparation of a Statistical Copolymer Poly(Trifluoroethyl Methacrylate-Random-Sulfobetaine Methacrylate) (PTFEMA-r-SBMA or P40)

In this example, a statistical copolymer was synthesized by following the protocol reported in Bengani et al., *Journal of Membrane Science*, 2015, 493, 755-765.

More specifically, 2,2,2-trifluoroethyl methacrylate (TFEMA, Sigma Aldrich) was passed through a column of basic activated alumina (VWR) to remove the inhibitor. Sulfobetaine methacrylate (SBMA; 5 g, 17.9 mmol) was dissolved in dimethyl sulfoxide (DMSO, 100 ml) in a round bottom flask while stirring at 350 rpm. TFEMA (5 g, 29.7 mmol) and a thermal initiator azobisisobutyronitrile (AIBN, 0.01 g, Sigma Aldrich) were added to the flask. The flask was sealed with a rubber septum, and nitrogen was bubbled through the contents of the flask for 20 minutes to purge any dissolved oxygen. The flask was then placed in an oil bath at 70° C. while stirring at 350 rpm. After at least 16 hours, 0.5 g of 4-methoxyphenol (MEHQ) was added to terminate the reaction. The reaction mixture was precipitated in a 50:50 mixture of ethanol and hexane. The product was vacuum filtered and remaining solvent and monomers were extracted by stirring the polymer in two fresh portions of methanol for several hours, followed by drying in the vacuum oven overnight at 50° C. to obtain the copolymer PTFEMA-r-SBMA. The composition of this white copolymer was calculated from the $^1$H-NMR spectrum, using the ratio of the total backbone protons (0.5-2 ppm) to the protons of SBMA (2-3.5 ppm). The copolymer thus obtained was determined to contain 36 wt % SBMA.

Example 2: Preparation of Modified P40 Copolymer Membranes Prepared Using Different Amounts of Ionic Liquids In this example, several membranes were prepared using the copolymer described in EXAMPLE 1 in the presence or absence of an ionic liquid as follows.

More specifically, ionic liquid ethyl ammonium nitrate (EAN, Iolitec) was dissolved in trifluoroethanol. The copolymer (1 g) was dissolved in 9 mL of total solvent content (ionic liquid and trifluoroethanol) so the copolymer concentration was kept constant at 10% (w/v) to form copolymer solutions. P40, IL2, IL5 and IL20 solutions were prepared by mixing 0 mL, 0.2 mL, 0.5 mL, and 2 mL of the ionic liquid in 9 mL, 8.8 mL, 8.5 mL, and 7 mL of trifluoroethanol, respectively and dissolving 1 g of copolymer in each. Copolymer solutions were stirred for at least two hours at approximately 50° C. to prepare a 10% (w/v) copolymer casting solutions. Each of the copolymer casting solutions was passed through a 0.45 μm syringe filter (Whatman) and degassed in a vacuum oven for at least 2 hours. The membranes were prepared by coating a thin layer of copolymer casting solution on a commercial ultrafiltration (UF) membrane using a 25 m doctor blade gap. Polyvinylidene Fluoride (PVDF) 400R ultrafiltration membrane, purchased from Nanostone Water (Eden Prairie, MN), was used as the base membrane. After coating, the membrane was immersed in isopropanol, i.e., a polar non-solvent bath, for 20 minutes, followed by immersion in a water bath for at least overnight. Being water soluble, the ionic liquid was effectively removed in the water bath, and the membranes were moved to another water bath for storage.

Film thickness and morphology were determined by examining freeze-fractured cross-sections of the membranes using a scanning electron microscope (SEM). See FIG. 1 below.

Shown in this figure, left to right, are SEM images of the uncoated PVDF 400R base membrane and three modified P40 membranes prepared using ionic liquids: IL2, IL5, and IL20, all at the same magnification. As compared to the SEM image of the PVDF 400R base membrane, the SEM image of IL2, IL5 and IL20 show a dense coating layer (i.e. no large pores or macrovoids) with a thickness of about 0.5-3 m formed using a 25 m doctor blade gap. The coating thickness varies between 0.5-3 m depending on the amount of ionic liquid in the copolymer casting solution for a given doctor blade gap size.

Figure 2:
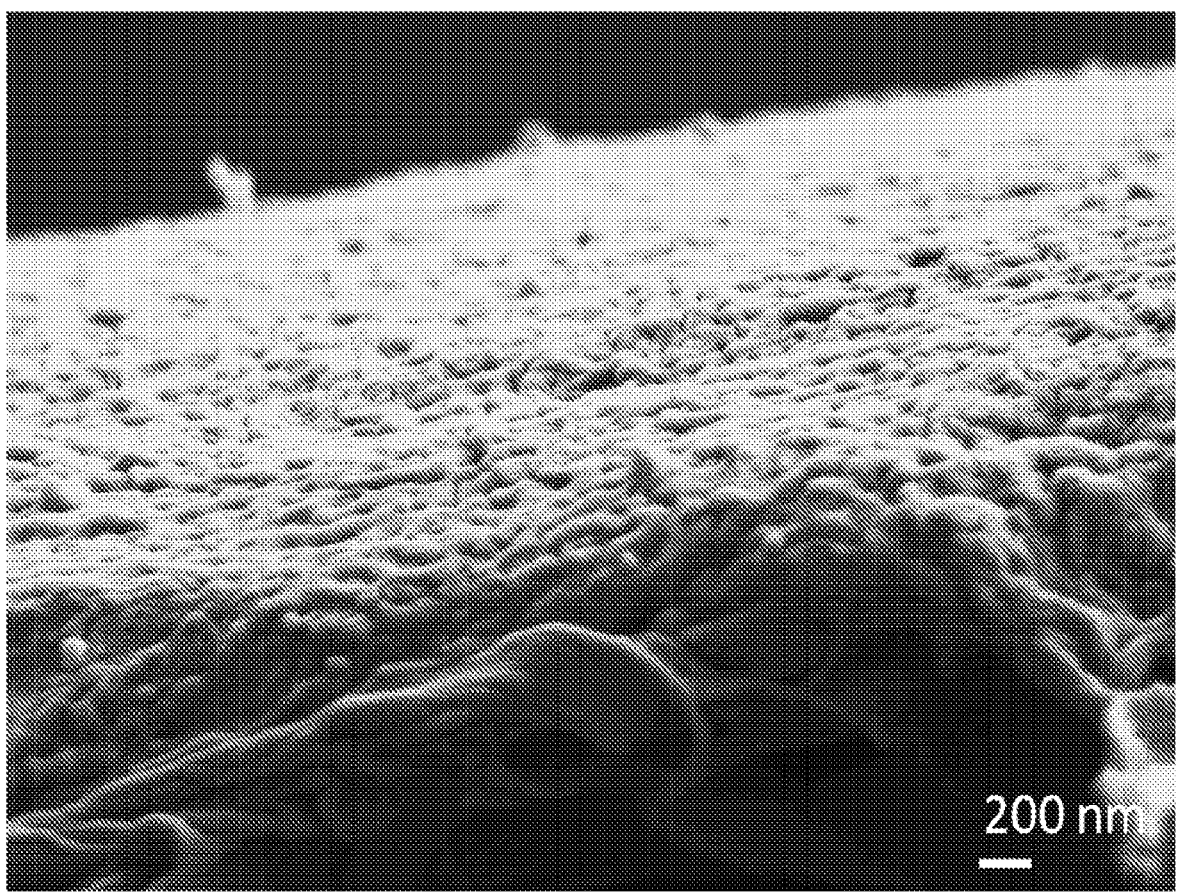
FIG. 2 is a schematic depiction of cross-sectional FESEM image of IL20 membrane (sample 2-3) showing dense copolymer coating.

Film morphology of IL20 membrane (sample 2-3) was further characterized by examining freeze-fractured cross-section of the membrane using field emission scanning electron microscope (FESEM). See FIG. 2 below. FESEM of IL20 shows that a dense coating layer was formed.

Example 3: Water Permeability of Modified P40 Copolymer Membranes Prepared Using Different Amounts of Ionic Liquids In this example, the pure water fluxes through the membranes described in EXAMPLE 2 were measured as follows.

This study was performed using an Amicon 8010 stirred, dead-end filtration cell (Millipore) with a cell volume of 10 mL and an effective membrane filtration area of 4.1 cm². The cell was stirred continuously, and the test was performed at 10 psi (0.7 bar). After a stabilization period of at least one hour, permeate samples were collected over regular intervals. Permeate weight was measured by a Scout Pro SP401 balance connected to a Dell laptop, which automatically takes measurements every 30 seconds using TWedge 2.4 software (TEC-IT, Austria). Flux is calculated by dividing the permeate volume by filtration area and experiment time. Pure water permeance is obtained by normalizing the flux value by the pressure (see Table 1 below).

Shown in Table 1 below are water permeance and permeability of neat P40 membrane and modified P40 copolymer membranes prepared using different amounts of ionic liquids during membrane formation. The study was performed on both neat P40 membrane (sample 2-4) and three modified P40 membranes, i.e., IL2 (sample 2-1), IL5 (sample 2-2), and IL20 (sample 2-3).

It was found that permeance of neat P40 membrane was 6.1±1 L/m²h·bar, whereas that of modified P40 membrane IL20 was unexpectedly found to be above 50±2 L/m²h·bar, i.e. an order of magnitude higher as compared to the neat P40 membrane. The permeability of neat P40 membranes was found to be 6.4±1 L·μm./m²h·bar, whereas permeability of IL20 membrane was above 125±5 L·μm./m²h·bar, i.e. two orders of magnitude higher as compared to neat P40 membrane, despite its thicker coating. The permeabilities of IL20 membrane were much higher than commercial Nanofiltration (NF) membranes despite the thicker coatings. IL20 membrane tested had coatings that were always >2.5 μm in thickness. In comparison, commercial NF membranes have selective layers as thin as <0.1 μm. Permeance of PVDF400R base membrane is 200+20 L/m²h·bar.

Permeances of IL2 and IL5 membranes were found to be 0.7±0.2 L/m²h·bar and 1.7±0.7 L/m²h·bar, respectively, i.e. somewhat lower than the permeances of neat P40 membrane prepared without any co-solvent, even though the coating thickness was similar or even slightly lower for IL5 membrane. This indicates that, for the particular membrane described in EXAMPLE 2, too low ionic liquid content (≤5%) resulted in either no increase or a decrease in water permeability through the copolymer layer. Coatings prepared with 50% ionic liquid content in casting solution resulted in poor integrity of the coating in water. This indicates that the increase in membrane permeability occurred for a specific range of ionic liquid concentration (i.e., volume of ionic liquid in the casting solution) for a given copolymer composition (i.e., ratio of zwitterionic and hydrophobic repeat units in the copolymer).

TABLE 1

Water permeance and permeability of the neat P40 and modified P40 copolymer membranes prepared using different amounts of ionic liquid co-solvents during membrane formation

| Membrane | Copolymer (w/v %) | Ionic liquid content (v/v %) | Permeance (L/m²h · bar) | Permeability (L · μm/m²h · bar) |
|---|---|---|---|---|
| Neat P40 | 10 | 0 | 6.1 ± 1 | 6.4 ± 1 |
| IL2 | 10 | 2 | 0.7 ± 0.2 | 0.8 ± 0.2 |
| IL5 | 10 | 5 | 1.7 ± 0.7 | 1.2 ± 0.2 |
| IL20 | 10 | 20 | 50 ± 2 | 125 ± 2 |

Example 4: Dye Rejection of P40 Membrane and Modified P40 Copolymer Membrane IL20

In this example, negatively charged and neutral solutes (dyes and vitamins) were used to identify the effective pore size or size cut-off of membranes prepared as described in EXAMPLE 2.

Figure 3:
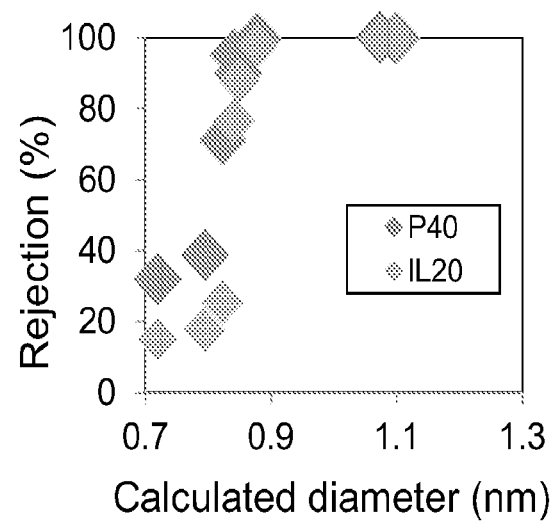
FIG. 3 is a schematic depiction of rejection of charged and neutral molecules of different calculated molecular diameters by neat P40 membrane and modified P40 membrane IL20. Both membranes exhibited a selectivity with a size cut-off about 0.8-1 nm.

These solutes were used because they are rigid, and their concentrations can be easily and accurately measured by UV-Vis spectroscopy. Solute rejection experiments were performed on an Amicon 8010 stirred, dead-end filtration cell (Millipore) with a cell volume of 10 mL and an effective filtration area of 4.1 cm². To account for the differences in membrane permeances of P40 membrane and modified P40 membrane IL20, studies were performed at a constant initial water flux of 6.1 L·m$^{-2}$·hr$^{-1}$ (equivalent to initial flux of P40 membrane) by adjusting the feed pressure. This pressure was kept constant throughout the experiment even if membrane flux declined upon the introduction of the solute. The cell was stirred continuously to minimize concentration polarization effects. After running pure water through the membrane for at least an hour, the cell was emptied, and filled with a 100 mg/L aqueous solution of the probe solute. After discarding the first 1 ml, the next 1 ml sample was collected for analysis by UV-Visible spectrophotometry. The cell was rinsed several times with deionized water. Deionized water was filtered through the membrane until the permeate was clear before switching to a new probe solute. FIG. 3 below shows the retention of various negatively charged and neutral solutes by neat P40 membrane (sample 2-4) and IL20 membrane (sample 2-3) mentioned in EXAMPLES 2 and 3.

Shown in Table 2 below are molecular size and charge of solutes used in testing the effective membrane size cut-off, and their rejections by neat P40 membrane and IL20 membrane.

TABLE 2

Molecular size and charge of solutes used in testing the effective membrane size cut-off, and their rejection by the membranes described in EXAMPLE 4

| Solute name | Calculated molecular diameter (nm) | Net charge | Solute Rejection (%) P40 | Solute Rejection (%) IL20 |
|---|---|---|---|---|
| Vitamin B12 | 1.3 | 0 | 96 | 95 |
| Brilliant Blue R | 1.108 | −1 | 100 | 99.9 |
| Direct Red 80 | 1.073 | −6 | 100 | 99 |
| Chicago Sky Blue 6B | 0.879 | −4 | 99 | 96 |
| Riboflavin | 0.849 | 0 | 90 | 88 |
| Acid Blue 45 | 0.841 | −2 | 95 | 82 |
| Ethyl Orange | 0.823 | −1 | 71 | 25 |

TABLE 2-continued

Molecular size and charge of solutes used in testing the
effective membrane size cut-off, and their rejection by the
membranes described in EXAMPLE 4

| Solute name | Calculated molecular diameter (nm) | Net charge | Solute Rejection (%) P40 | Solute Rejection (%) IL20 |
|---|---|---|---|---|
| Methyl Orange | 0.794 | −1 | 39 | 18 |
| Pyridoxine | 0.719 | 0 | 32 | 15 |

The solute diameter shown in Table 2 above was calculated based on the molecular volume values obtained by Molecular Modeling Pro software by ChemSW, using the calculated molecular volume and fitting a sphere of matching volume to this value. Based on the filtration of these anionic and neutral solutes, the size cut-off of the membranes prepared using ionic liquid co-solvent was found to be between 0.8 nm and 1 nm and the rejections of these solutes were related directly with the molecular size of the solute rather than its charge, as shown in Table 2.

Essentially no measurable change in pore size was observed between neat P40 membrane and modified P40 membrane IL20. It was observed that IL20 membrane unexpectedly exhibited a narrow pore size distribution, which is especially hard to achieve with membranes in this pore size range. More importantly, using an ionic liquid as co-solvent in the copolymer casting solution, the flux was unexpectedly improved ten-fold while retaining the selectivity. Thus, this method of membrane manufacturing is highly valuable as few methods are known to improve membrane flux without sacrificing the pore size.

Of the membranes prepared by different amount of ionic liquid co-solvents, IL20 membrane had the highest selective layer permeability resulting in ten-fold increase in permeance compared to neat P40 membrane, while maintaining the selectivity. At this stage of screening, IL20 membrane was chosen as the top choice for further testing.

Example 5: Salt Rejection by Modified P40 Copolymer Membranes Prepared Using Different Amounts of Ionic Liquid Co-Solvent In this example, membranes prepared as described in EXAMPLE 2 were used in retention studies to determine their salt retention properties as follows.

The retention studies were performed on an Amicon 8010 stirred, dead-end filtration cell (Millipore; a filtration device with certain capacity) with a cell volume of 10 mL and an effective filtration area of 4.1 cm$^2$. Due to the different membrane permeances of P40 membrane and modified P40 membrane IL20, the test was performed under constant initial flux conditions. The cell was stirred continuously to minimize concentration polarization effects. After running pure water through the membrane for at least an hour, the cell was emptied and filled with a 200 mg/L solution of magnesium sulfate (MgSO$_4$, Aldrich). After an initial equilibration period, a filtrate was collected for analysis by a standard conductivity probe. The cell was rinsed several times with water and pure water was run through the membrane before switching to another feed solution.

MgSO$_4$ salt retention was found to be 17.4% by using neat P40 membrane and, unexpectedly, less than 10% by using modified P40 membranes (IL2, IL5, and IL20).

Example 6: Formation of Modified P40 Copolymer (IL20) Membranes Using Different Solvent Evaporation Times During Membrane Formation In this example, several membranes were prepared using IL20 casting solution as follows.

IL20 solutions were prepared by mixing 2 ml of ionic liquid (ethylammonium nitrate) in 7 mL of trifluoroethanol and dissolving 1 g of P40 copolymer in it. Copolymer solutions were stirred for at least two hours at approximately 50° C. to prepare a 10% (w/v) copolymer casting solution. The copolymer casting solution was passed through a 0.45 micrometer syringe filter (Whatman) and degassed in a vacuum oven for at least 2 hours. The membranes were prepared by coating a thin layer of copolymer casting solution on a commercial ultrafiltration (UF) membrane using a 25 m doctor blade gap. PVDF 400R ultrafiltration membrane, purchased from Nanostone Water (Eden Prairie, MN), was used as the base membrane. After coating, the membrane was air dried for different time periods before immersion in a water bath at least overnight. The selected drying times ranged from few seconds to 20 minutes. IL20_b, IL20_c, IL20_d, IL20_e thin film composite membranes were prepared by solvent evaporation times of 20 seconds, 2 minutes, 10 minutes and 20 minutes, respectively. Being water soluble, the ionic liquid additive is effectively removed in the water bath, and the membranes were moved to another water bath for storage.

Figure 4:
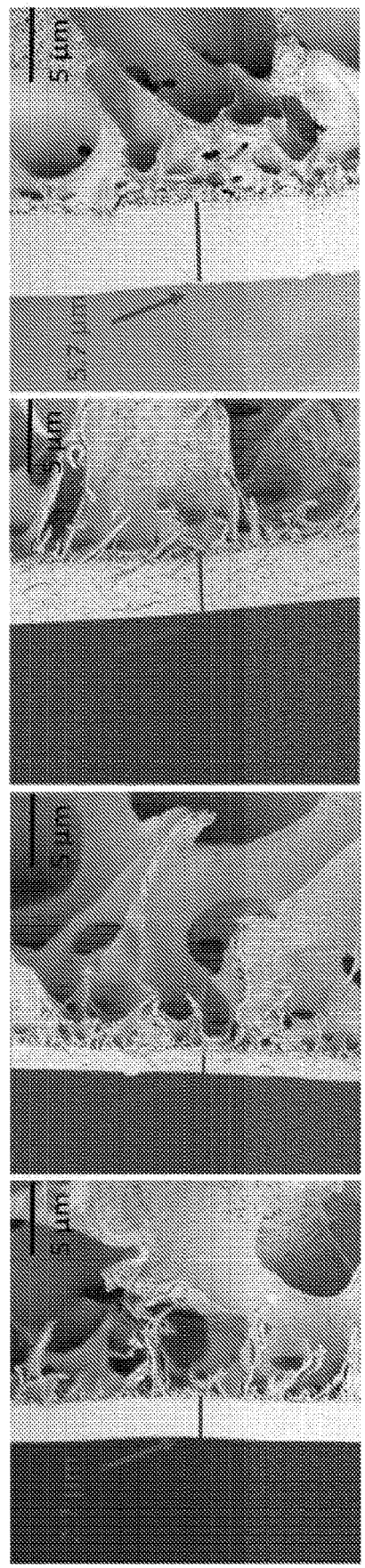
FIG. 4 is a schematic depiction of SEM images of IL20 membranes prepared using different solvent evaporation times during membrane formation. Left to right: IL20_b, membrane dried for 20 seconds (sample 3-1); IL20_c, membrane dried for 2 minutes (sample 3-2); IL20_d, membrane dried for 10 minutes (sample 3-3); and IL20_e, membrane dried for 20 minutes (sample 3-4). All samples show dense coatings 1-6 μm in thickness.

Film thickness and morphology were determined by examining freeze-fractured cross-sections of the membranes using a scanning electron microscope (SEM). See FIG. 4 below.

SEM images were obtained for four membranes formed from an IL20 copolymer solution using different drying times during membrane formation IL20_b, IL20_c, IL20_d, IL20_e, all at the same magnification. Shown, left to right, in FIG. 4 below are IL20_b, membrane dried for 20 seconds (sample 3-1); IL20_c, membrane dried for 2 minutes (sample 3-2); IL20_d, membrane dried for 10 minutes (sample 3-3); and IL20_e, membrane dried for 20 minutes (sample 3-4). The SEM images of all four membranes show a dense coating layer (i.e. no large pores or macrovoids). The coating thickness varies between 1 m and 6 m depending on the drying time during membrane formation for a given doctor blade gap size.

Example 7: Water Permeability of Modified P40 Copolymer Membrane IL20 Prepared Using Different Solvent Evaporation Times During Membrane Formation In this example, the pure water fluxes through the membranes described in EXAMPLES 2 and 6 were measured using an Amicon 8010 stirred, dead-end filtration cell (Millipore) with a cell volume of 10 mL and an effective membrane filtration area of 4.1 cm$^2$ as follows.

The cell was stirred continuously, and the test was performed at 10 psi (0.7 bar). After a stabilization period of at least one hour, permeate samples were collected over regular intervals. Permeate weight was measured by a Scout Pro SP401 balance connected to a Dell laptop, which automatically takes measurements every 30 seconds using TWedge 2.4 software (TEC-IT, Austria). Flux is calculated by dividing the permeate volume by filtration area and experiment time. Pure water permeance is obtained by normalizing the flux value by the pressure (see Table 3 below).

Shown in Table 3 below are water permeance and permeability of membranes prepared with IL20 copolymer casting solutions using different membrane manufacturing methods. The study was performed on IL20 membranes prepared using different drying times during membrane formation (samples 3-1, 3-2, 3-3 and 3-4) and that prepared without drying but by direct immersion in a non-solvent bath (sample 2-3).

It was found that permeances of IL20_c, IL20_d, IL20_e membranes prepared using various drying times of at least 2 minutes during membrane formation (samples 3-2, 3-3, and 3-4; Table 3) were much lower than the permeances of IL20. The permeance of IL20_b membrane prepared with a short drying time of 20 seconds during membrane formation (sample 3-1, Table 3) unexpectedly showed permeances that were an order of magnitude higher than neat P40 membrane, and similar to IL20 membrane prepared by non-solvent immersion (sample 2-3, Table 3). This indicates that fast drying times (20 seconds) or isopropanol immersion during membrane formation unexpectedly led to membranes with high permeances, much higher than commercial Nanofiltration (NF) membranes despite the thicker coatings. IL20 membranes tested had coatings that were always >1 µm in thickness. In comparison, commercial NF membranes have selective layers as thin as <0.1 µm. Indeed, higher fluxes can be obtained with these membranes by using the coating methods described above.

| Membrane | Drying time before water immersion | Non-solvent before water immersion | Permeance (L/m²h · bar) | Permeability (L · µm/ m2h · bar) |
|---|---|---|---|---|
| IL20 (sample 2-3) | N/A | Isopropanol (20 min) | 50 ± 2 | 125 ± 2 |
| IL20_b (sample 3-1) | 20 sec | N/A | 20.4 ± 0.8 | 55.08 ± 1 |
| IL20_c (sample 3-2) | 2 min | N/A | 3.3 ± 0.2 | 5 ± 0.3 |
| IL20_d (sample 3-3) | 10 min | N/A | 2.9 ± 0.6 | 11.8 ± 0.8 |
| IL20_e (sample 3-4) | 20 min | N/A | 1 ± 0.5 | 5.7 ± 0.6 |

Example 8: Fourier Transform Infrared Spectroscopy of Neat P40 and Modified P40 Membranes (IL20)

In this example, the presence of copolymer coating on membrane sample 2-3 prepared as described in EXAMPLE 2 was analyzed using Attenuated total reflection fourier transform infrared (ATR-FTIR) spectroscopy as follows.

Figure 5:
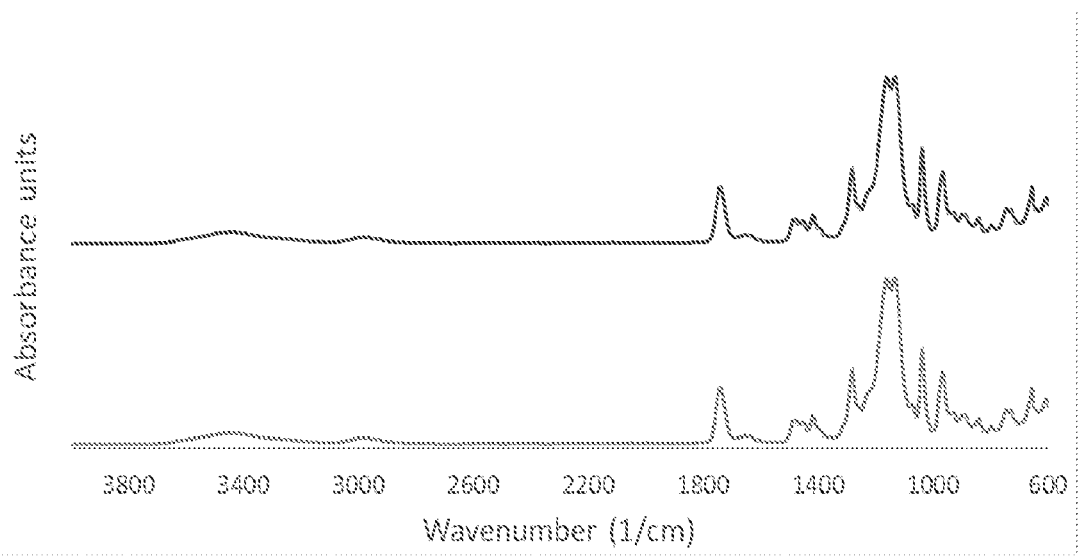
FIG. 5 is a schematic depiction of FTIR spectra of air-dried samples of neat P40 (sample 2-4, top) and IL20 membrane (sample 2-3, bottom). No significant change in membrane structure or morphology is observed. Spectra show that the copolymer layer of IL20 membranes is intact.

FTIR spectra of air-dried samples of neat P40 membrane and modified P40 membrane IL20 were compared. See FIG. 5 below. The spectra of IL2-membranes showed no additional peaks, indicating that the ionic liquid was completely removed when the membranes were immersed in deionized water prior to any membrane testing.

Example 9: Bubble Point Measurement of Neat P40 and Modified P40 Copolymer Membrane (IL20)

In this example, the intactness and integrity of copolymer coating on membrane sample 2-3 prepared as described in EXAMPLE 2 was analyzed using bubble point test as follows.

As an indicator of the largest pore size present on the membrane surface, a simple lab-scale bubble point measurement was performed on PVDF 400R base membrane (sample 2-5), neat P40 (sample 2-4) and modified P40 membrane (IL20, sample 2-3) samples. The membrane samples were wetted by water and contained in a system, where the pressure is slowly increased until the first continuous bubble is observed at the outlet. The minimum pressure required to force water out of the pores is a measure of the largest pore diameter in the membrane. It was observed that the bubble point for PVDF 400R was 6 psi whereas that of the neat P40 and modified P40 membranes (IL20) did not show any continuous bubble formation at least until 60 psi, i.e. the upper detection limit of the equipment. This indicates that the copolymer coating is intact and large pores or exposed areas of PVDF 400R base membrane are absent and do not contribute to the 10 times high flux increase observed in the modified P40 membranes (IL20).

Example 10: Contact Angle of Neat P40 and Modified P40 Copolymer Membranes (IL20)

In this example, the surface properties of membrane sample 2-3 prepared as described in EXAMPLE 2 were determined using a goniometer.

As an indicator of the hydrophilicity of the materials, captive bubble contact angle measurements were performed on neat P40 membrane (sample 2-4) and three modified P40 membranes IL2 (sample 2-1), IL5 (sample 2-2), and IL20 (sample 2-3), while being immersed completely in water. It was observed that the contact angle of the neat P40 membrane was about 29.3±3 degree, whereas those of modified P40 membranes IL2, IL5, and IL20 were unexpectedly found to be 26.7±3 degree, 26.3±2 degree, and 25.9±4 degree, respectively. There was no appreciable change in contact angle of the modified P40 samples including IL20 indicating that hydrophilicity of the copolymer coating was not significantly affected by using an ionic liquid during membrane formation.

OTHER EMBODIMENTS

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

Further, from the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

What is claimed is:

1. A method of preparing a filtration membrane, comprising:
providing a copolymer solution by dissolving a statistical copolymer in a mixture of a co-solvent and an organic solvent, wherein the co-solvent is ethyl ammonium nitrate; and the organic solvent differs from the co-solvent;
coating the copolymer solution onto a porous support layer to form a polymeric layer thereon;

coagulating the polymeric layer to afford a thin film composite membrane; and immersing the thin film composite membrane into a water bath to obtain a filtration membrane;

wherein the copolymer solution comprises the statistical copolymer at 1 to 99 w/v %, the co-solvent at 5 to 49 v/v %, and the organic solvent at 51 to 95 v/v %;

the statistical copolymer comprises zwitterionic repeat units and hydrophobic repeat units, wherein the zwitterionic repeat units constitute 30-50% by weight of the statistical copolymer, the hydrophobic repeat units constitute 50-70% by weight of the statistical copolymer; and the statistical copolymer is selected from the group consisting of poly((trifluoroethyl methacrylate)-r-(sulfobetaine methacrylate)), poly((methyl methacrylate)-r-(sulfobetaine methacrylate)), poly((trifluoroethyl methacrylate)-r-(3-(2-vinylpyridinium-1-yl)propane-1-sulfonate)), poly((trifluoroethyl methacrylate)-r-(phosphorylcholine methacrylate), or poly((trifluoroethyl methacrylate)-r-(3-(2-vinylpyridinium-1-yl)butane-1-sulfonate)); and the co-solvent is miscible with both water and the organic solvent.

2. The method of claim 1, wherein the organic solvent is selected from the group consisting of trifluoroethanol, dimethyl sulfoxide, formamide, dimethyl formamide, hexafluoro isopropanol, N-methyl-2-pyrrolidone, pyridine, dioxane, toluene, chloroform, benzene, carbon tetrachloride, chlorobenzene, 1,1,2-trichloroethane, dichloromethane, ethylene dichloride, xylene, tetrahydrofuran, methanol, and ethanol.

3. The method of claim 1, wherein the porous support layer has an effective pore size larger than that of the polymeric layer and is formed of polyethersulfone, polyphenylenesulfone, polyphenylenesulfidesulfone, polyacrylonitrile, cellulose ester, polyphenyleneoxide, polypropylene, polyvinyledenefluoride, polyvinylchloride, polyarylsulfone, polyphenylene sulfone, polyetheretherketone, polysulfone, polyamide, polyimide, or a combination thereof.

4. The method of claim 3, wherein the porous support layer is a flat sheet membrane or a hollow fiber membrane.

5. The method of claim 1, further comprising an annealing step after the immersing step, wherein the filtration membrane thus obtained is annealed in a water bath at 50° C. or higher.

6. The method of claim 1, wherein the copolymer solution comprises the co-solvent at 20 v/v %.

7. The method of claim 1, wherein the membrane comprises the copolymer at 10 w/v %.

8. The method of claim 1, wherein the copolymer solution comprises the co-solvent at 20 v/v %; and the membrane comprises the copolymer at 10 w/v %.

9. The method of claim 1, wherein the organic solvent is trifluoroethanol.

10. A method of preparing a filtration membrane, comprising:

providing a copolymer solution by dissolving a statistical copolymer in a mixture of a co-solvent and an organic solvent, wherein the co-solvent is ethyl ammonium nitrate; and the organic solvent differs from the co-solvent;

coating the copolymer solution onto a porous support layer to form a polymeric layer thereon;

coagulating the polymeric layer to afford a thin film composite membrane; and immersing the thin film composite membrane into a water bath to obtain a filtration membrane, wherein the copolymer solution comprises the statistical copolymer at 1 to 99 w/v %, the co-solvent at 5 to 49 v/v %, and the organic solvent at 51 to 95 v/v %; and the statistical copolymer comprises zwitterionic repeat units and hydrophobic repeat units, wherein the zwitterionic repeat units constitute 30-50% by weight of the statistical copolymer, the hydrophobic repeat units constitute 50-70% by weight of the statistical copolymer, the statistical copolymer is poly((trifluoroethyl methacrylate)-r-(sulfobetaine methacrylate)), and the first organic solvent is ethanol.

* * * * *